United States Patent [19]

Pollard

[11] Patent Number: 5,303,463
[45] Date of Patent: Apr. 19, 1994

[54] TIRE BALANCING SYSTEM

[76] Inventor: Douglas J. Pollard, 100 Riverfront Dr., #802, Detroit, Mich. 48226-4537

[21] Appl. No.: 21,270

[22] Filed: Mar. 1, 1993

[51] Int. Cl.$^5$ .................................. B23Q 17/00
[52] U.S. Cl. .................... 29/705; 29/901; 73/462; 157/1.1; 157/1.17; 301/5.21
[58] Field of Search ........... 29/705, 901, 802; 157/1.1, 1.17; 73/462, 468; 301/5.21

[56] References Cited

U.S. PATENT DOCUMENTS

| | | | |
|---|---|---|---|
| 1,847,774 | 3/1932 | Main et al. | 301/5.21 |
| 2,080,227 | 5/1937 | Periat et al. | 301/5.21 |
| 2,580,343 | 12/1951 | Benoit | 152/427 |
| 3,280,637 | 10/1966 | Ealey et al. | 73/457 |
| 4,106,964 | 8/1978 | DeVittorio | 156/75 |
| 4,388,841 | 6/1983 | Gamble | 74/573 F |
| 4,451,963 | 6/1984 | Karr et al. | 29/720 |
| 4,480,471 | 11/1984 | Kögler et al. | 73/462 |
| 4,554,734 | 11/1985 | Sander | 29/818 |
| 4,858,667 | 8/1989 | Igari et al. | 157/1.1 |
| 5,170,828 | 12/1992 | Curcuri | 157/1.17 |

FOREIGN PATENT DOCUMENTS

| | | | |
|---|---|---|---|
| 53905 | 5/1981 | Japan | 157/1.1 |
| 236809 | 11/1985 | Japan | 157/1.1 |

Primary Examiner—P. W. Echols
Attorney, Agent, or Firm—Gifford, Groh, Sprinkle, Patmore and Anderson

[57] ABSTRACT

A system is disclosed for assembling and balancing automotive wheels. Each wheel includes a wheel rim having a valve stem opening and a tire adapted to be mounted on the rim. The circumferential position and magnitude of any tire imbalance is marked on the tire. A plurality of valve stems is also provided wherein the valve stems vary in weight from each other. The tire is positioned with respect to the rim so that the valve stem opening is substantially diametrically opposed to the circumferential position of the tire imbalance and a valve stem having a weight substantially the same as the magnitude of the tire imbalance is then positioned in the valve stem opening. The tire is then inflated thus completing the assembly and balancing of the tire.

12 Claims, 5 Drawing Sheets

TIRE BALANCING SYSTEM

BACKGROUND OF THE INVENTION

I. Field of the Invention

The present invention relates to a machine and system for assembling and balancing automotive tires.

II. Description of the Prior Art

In the manufacture and assembly of automotive wheels, a tire is typically mounted to a rim and then inflated in order to form the automotive wheel. Due to the manufacturing process for manufacturing tires, the tires almost always have some tire imbalance. This tire imbalance must be corrected before mounting the wheels on the automotive vehicle.

Traditionally, lead weights have been attached to the rim of the tire to offset any imbalance of the tire. However, the use of lead is undesirable due to the potential environmental hazards of lead.

For this reason, it has been proposed that lead weights used on tires be covered by a plastic or teflon material in order to seal the lead. Such a system, however, has not proven wholly effective in use since the plastic or teflon coating is easily damaged, either during assembly of the weight onto the tire rim or during use of the vehicle and thus also exposes the lead to the environment.

SUMMARY OF THE PRESENT INVENTION

The present invention provides a system for assembling and balancing automotive wheels which overcomes the above mentioned disadvantages.

In brief, the automotive wheels according to the present invention comprise a wheel rim having a valve stem opening and a tire which is mounted onto the rim. Furthermore, this tire is marked at its circumferential position with indicia indicative of the magnitude of the tire imbalance. Preferably, this marking is through a UPC code although other means can also alternatively be used.

A plurality of valve stems are also provided wherein each valve stem varies in weight from the other. Thereafter, in order to assembly the tire to the rim, the tire is positioned so that the valve stem opening in the rim is substantially diametrically opposed to the circumferential position of the tire imbalance. A valve stem having a weight substantially the same as the magnitude of the tire imbalance is then positioned in the valve stem opening thus balancing the tire.

The tire is then inflated in the conventional fashion and the resulting wheel is balanced.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

FIG. is a diagrammatic view illustrating one portion of the present invention.

DETAILED DESCRIPTION OF A PREFERRED EMBODIMENT OF THE PRESENT INVENTION

Figure 3:
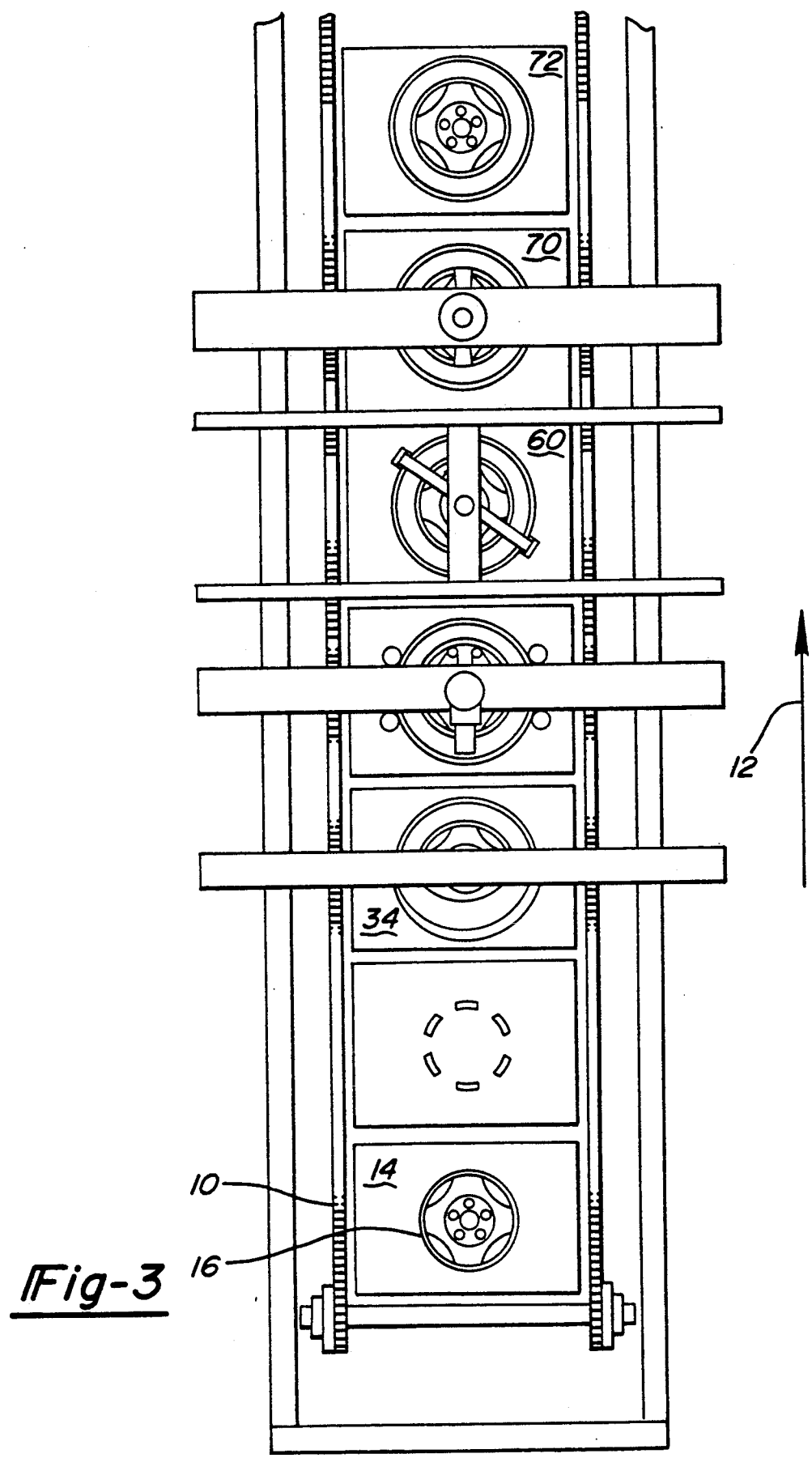
FIG. 3 is a top view illustrating a conveyor system for carrying out the present invention.

When reference first to FIG. 3, a preferred embodiment of a conveyor 10 for assembling and balancing an automotive tire is thereshown. The conveyor 10 moves in the direction of arrow 12. A plurality of operations are performed at various stations along the conveyor 10 which will be subsequently described in greater detail.

Figure 1:
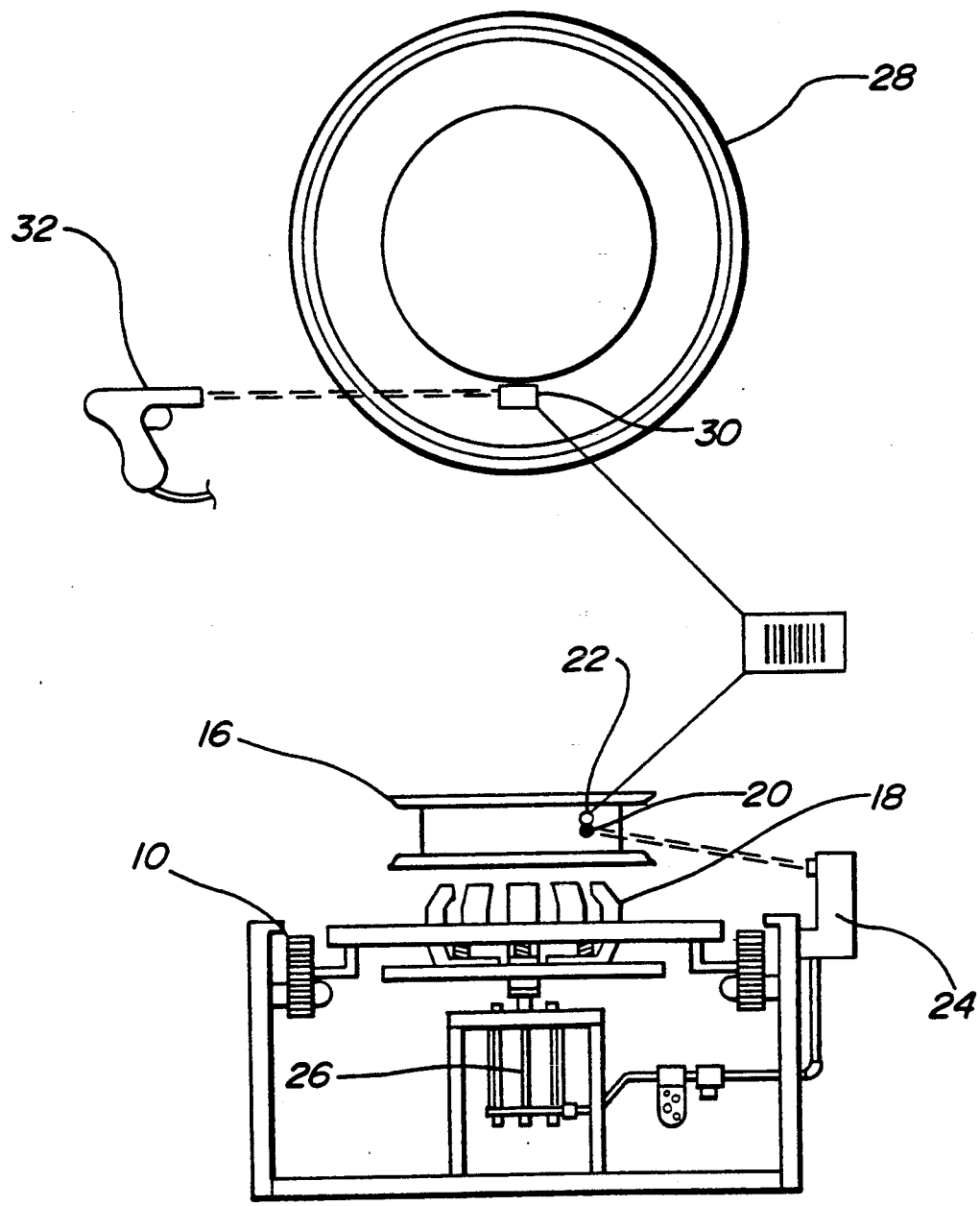
FIG. 1 is an exploded view illustrating a portion of the preferred embodiment of the present invention.

With reference now to FIGS. 3 and 1, at a first station 14 (FIG. 3) a conventional automotive tire rim 16 is positioned over a locking plate 18 carried by the conveyor 10. This locking plate 18 mechanically engages the interior of the rim 16 thus preventing rotation of the rim 16 relative to the locking plate 18.

As best shown in FIG. 1, the rim 16 includes an indicia or label 20, such as an UPC sticker, indicative of the position of a valve stem opening 22 in the rim 16. A laser reader 24 mounted to the side of the conveyor 10 is used to read this sticker 20 and, thus, the position of the valve stem opening 22. A motor 26 is then used to rotatably drive the locking plate 18 with its attached rim 16 thus rotating the valve stem opening 22 to a predetermined rotational position with respect to the conveyor 10.

Still referring to FIG. 1, a tire 28 is there illustrated. This tire 28, furthermore, includes a sticker or indicia 30 which is indicative both of the position and magnitude of any imbalance of the tire 28. Conventional means, such as a laser gun 32, is used to read this sticker 30.

Figure 2:
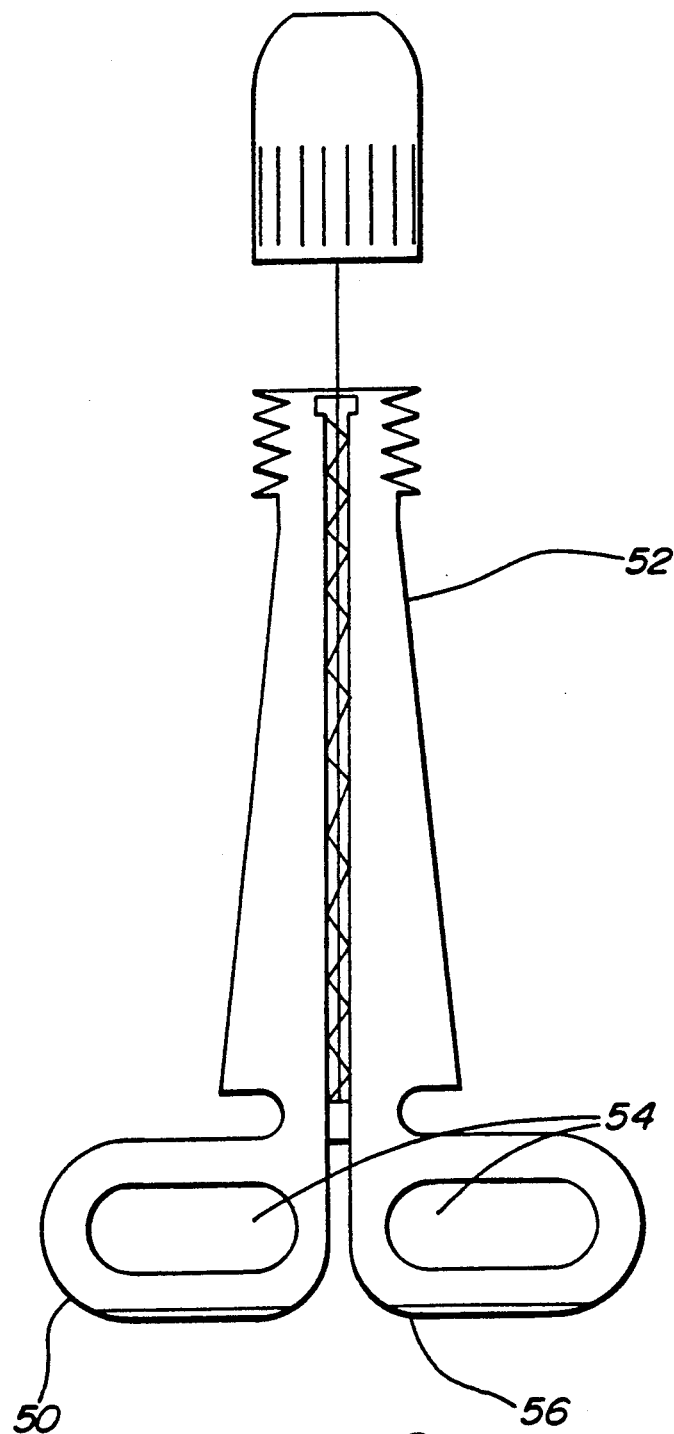
FIG. 2 is a side view illustrating a preferred embodiment of one valve stem of the present invention.

Referring now to FIGS. 2 and 3, the present invention also comprises a valve stem 50 having an elongated valve shaft 52 which is adapted to be positioned through the valve stem opening 22 in the rim 16. A lead weight 54, preferably encased in plastic or rubber material, is removably positioned around the valve shaft 52 and detachably locked to an inner end 56 of the valve stem 50. Preferably, a plurality of different valve weights 54 are provided in order to accommodate tire imbalances of varying magnitudes.

At the first station 14 the appropriate valve stem 50 having a weight sufficient to offset the magnitude of the tire imbalance as determined by the laser gun 32 from the tire 28 is positioned through the valve stem opening 22. Thus, each tire 28 is matched with each rim 16 prior to assembly of the wheel.

The tire 28 and rim 16 are then moved by the conveyor 10 to a tire load and soap station 34 where a lower rim of the tire 28 is positioned over the rim 16 on the conveyor 10. Conventional means are then used to apply soap around the rim of the tire in the conventional fashion at the station 34 to facilitate assembly of the tire 28 on the rim 16.

Figure 4:
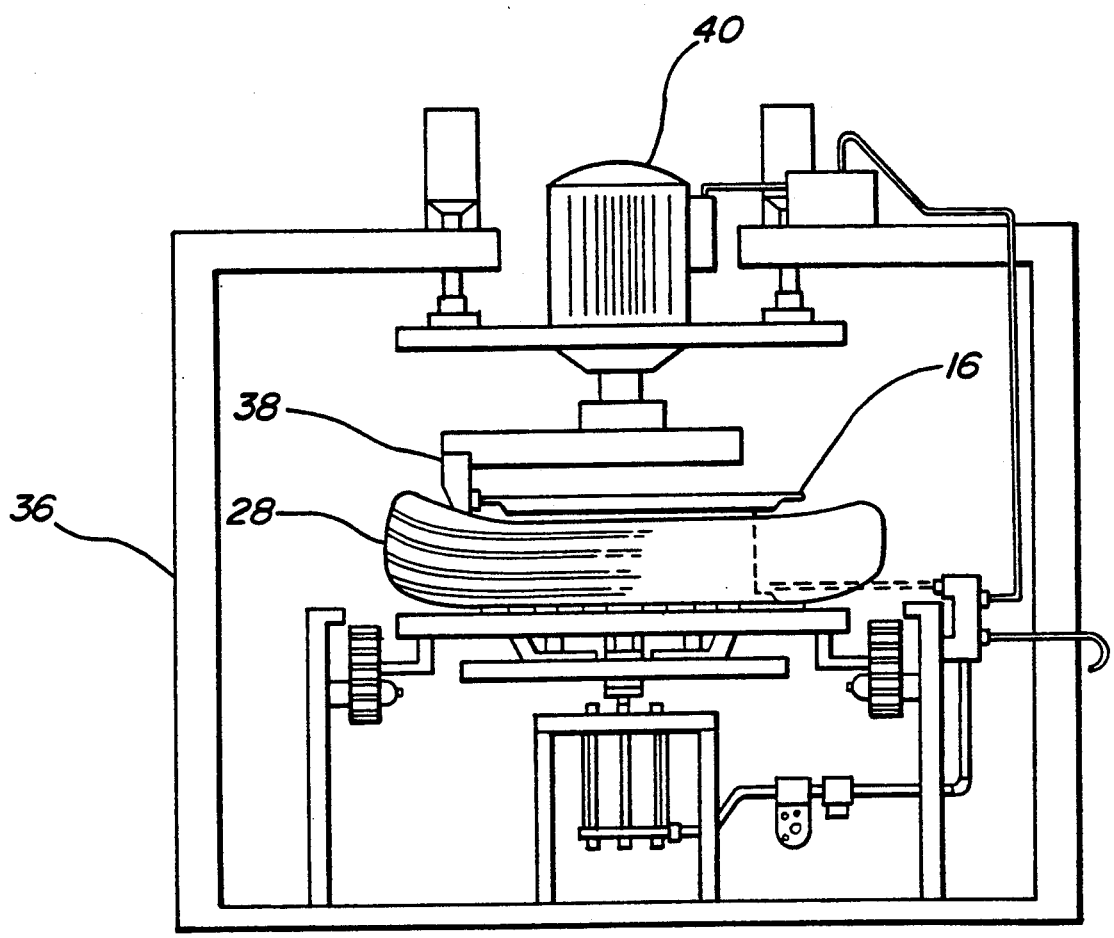
FIG. 4 is a side view of a tire mounting portion of the present invention.
Figure 5:
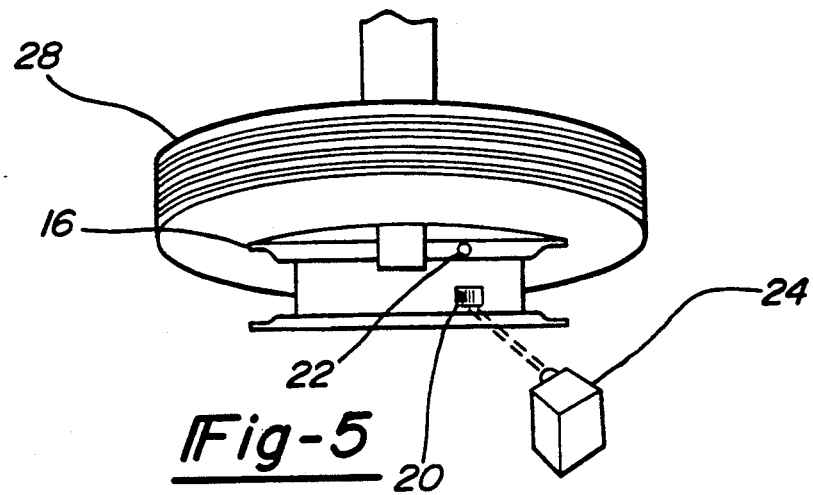
FIG. 5 is a diagrammatic view illustrating one portion of the present invention.

Referring now to FIGS. 3 and 4, the tire 28 and rim 16 are then moved by the conveyor 10 to a tire mounting station 36 along the conveyor 10. At the tire mounting station 36, a tire mounting arm 38 engages the rim of the tire 28. This arm 38 is rotatably driven by a motor 40 which positions the tire 28 over the rim 16 so that both rims of the tire 28 are positioned in between the ends of the tire rim 16 in the conventional fashion.

Figure 6:
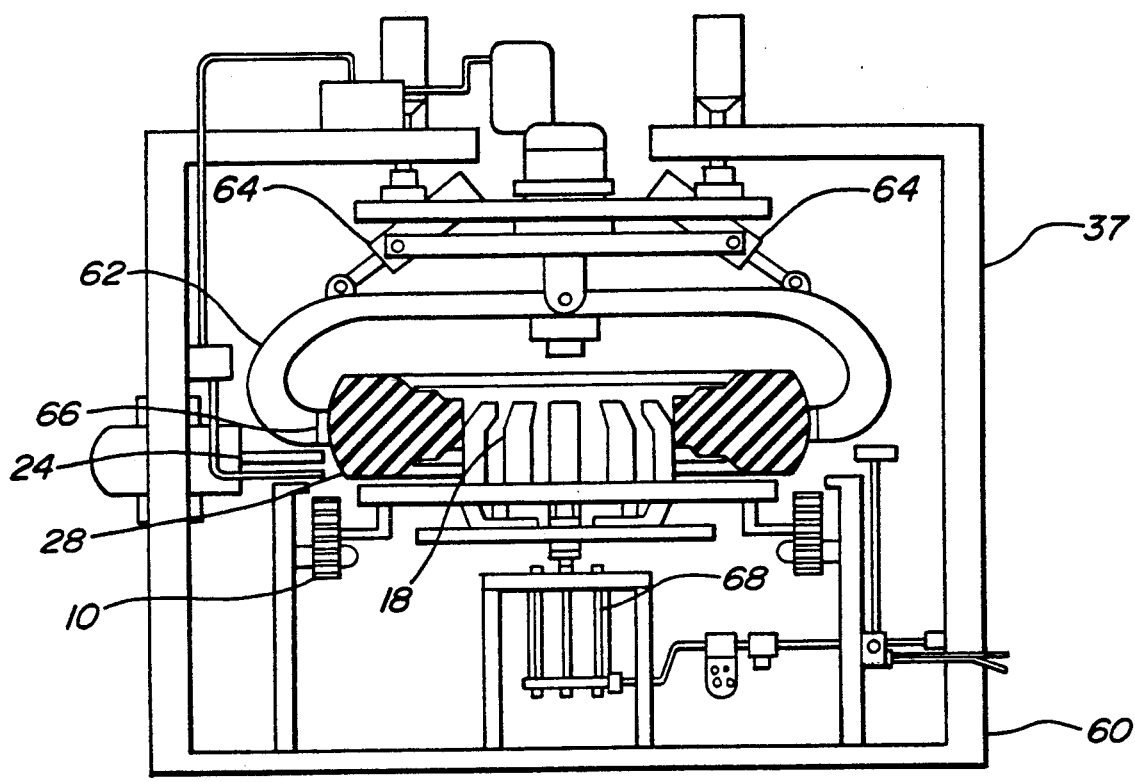
FIG. 6 is a view similar to FIG. 4 but illustrating another portion of the preferred embodiment of the present invention.

With reference now to FIGS 3 and 6, after the tire is mounted onto the rim at the tire mounting station 36, the tire and rim are moved to a tire coordinating station 60. At the tire coordinating station 60, a pair of arms 62 are pivotally mounted to a conveyor frame 37 above the tire on the conveyor 10. These arms 62 are pneumatically driven by cylinders 64 between an open position and a closed position (illustrated in FIG. 6) in which the ends 66 of the arms 62 frictionally engage the tire 28. Thereafter, with the rim 16 held against rotation by the locking plate 18, the arms 62 are rotatably driven by a motor 68 until the circumferential position of the tire imbalance, as determined at the first station 14, is diametrically opposed from the valve stem opening. The arms 62 are then moved to their open position thus releasing the tire 28.

Alternatively, the tire 28 can be held stationary and the rim 14 rotated until the valve stem 50 with its attached weight 54 is diametrically opposed from the tire imbalance.

Referring again to FIG. 3, the tire and rim are then moved to an inflator station 70 in which the tire 28 is inflated in the conventional fashion. The completely assembled automotive wheel is then moved to an auditor bouncer station 72 and removed for assembly onto a vehicle.

From the foregoing, it can be seen that, unlike the previously known system for balancing automotive tires, the present invention utilizes a valve stem having a selected weight designed to offset the imbalance of the tire and position this valve stem so that it is diametrically opposed from the tire imbalance. In doing so, the automotive tire, once inflated, is automatically balanced without the need for additional lead weights or rim weights attached to the wheel rim.

As best shown in FIG. 2 of the patent drawing, preferably the weights 54 are detachable secured to the valve stem 50 so that such weights can be reused if desired. Furthermore, these weights 54 for the valve stem 50 will be provided in a plurality of differing weights, e.g. ½ ounce–2½ ounces in ½ ounce increments so that tires having imbalances of different magnitudes can still be balanced in accordance with the present invention.

Having described my invention, however, many modifications thereto will become apparent to those skilled in the art to which it pertains without deviation from the spirit of the invention as defined by the scope of the appended claims.

I claim:

1. A system for assembling and balancing automotive wheels comprising:

a wheel rim having a valve stem opening,
   a tire adapted to be mounted on said rim,
   means for determining the circumferential position and magnitude of an imbalance of said tire,
   a plurality of valve stems, said valve stems varying in weight from each other,
   means for positioning said tire with respect to said rim so that the valve stem opening is substantially diametrically opposed to the circumferential position of said tire imbalance,
   one valve stem having a weight substantially the same as said magnitude of said tire imbalance being positioned in said valve stem opening, and
   means for inflating said tire thereby securing said tire and said rim together so that said valve stem offsets the tire imbalance.

2. The invention as defined in claim 1 wherein said means for determining the circumferential position and magnitude of an imbalance of said tire comprises a sticker applied to said tire at said circumferential position, said sticker containing indicia indicative of the magnitude of the tire imbalance.

3. The invention as defined in claim 2 wherein said sticker indicia comprises a UPC code, and laser gun means for reading said sticker.

4. The invention as defined in claim 1 wherein said positioning means comprises means for securing said rim against rotational movement and means for rotating said tire with respect to said rim.

5. The invention as defined in claim 4 wherein said rotating means comprises a pair of arms which frictionally engage said tire.

6. The invention as defined in claim 1 wherein each valve stem comprises an elongated valve shaft which extends outwardly through said valve stem opening, and a weight secured to an inner end of said valve shaft.

7. The invention as defined in claim 6 wherein said weight is detachable secured to said valve shaft.

8. The invention as defined in claim 7 wherein said weight is doughnut shaped and slidably positioned around said valve shaft.

9. The invention as defined in claim 8 and comprising means for locking said weight to said inner end of said valve shaft.

10. The invention as defined in claim 6 wherein said weight comprises lead covered with a plastic material.

11. The invention as defined in claim 1 and comprising a conveyor for moving said tire and said rim.

12. The invention as defined in claim 11 and comprising means for mounting said tire to said rim along said conveyor.

* * * * *